United States Patent [19]
Massonnet

[11] Patent Number: 6,130,644
[45] Date of Patent: Oct. 10, 2000

[54] METHOD AND APPARATUS FOR GEODETIC SURVEYING AND/OR EARTH IMAGING BY SATELLITE SIGNAL PROCESSING

[75] Inventor: Didier Massonnet, St-Orens de Gameville, France

[73] Assignee: Centre National d'Etudes Spatiales, Paris, France

[21] Appl. No.: 09/000,275

[22] PCT Filed: May 30, 1997

[86] PCT No.: PCT/EP97/02833

§ 371 Date: Jan. 27, 1998

§ 102(e) Date: Jan. 27, 1998

[87] PCT Pub. No.: WO98/07046

PCT Pub. Date: Feb. 19, 1998

[30] Foreign Application Priority Data

May 29, 1996 [FR] France ................................. 96 06584

[51] Int. Cl.[7] ........................................... G01S 3/02
[52] U.S. Cl. ................................... 342/453; 342/424
[58] Field of Search ................................. 342/453, 462, 342/353, 25, 352, 360, 424

[56] References Cited

U.S. PATENT DOCUMENTS

| | | | |
|---|---|---|---|
| 3,171,126 | 2/1965 | Wiley | 342/458 |
| 3,943,514 | 3/1976 | Afendykiw et al. | 342/453 |
| 4,170,776 | 10/1979 | MacDoran | 342/458 |

FOREIGN PATENT DOCUMENTS 42 10 823 A1  10/1993  Germany .................... G01S 13/88

OTHER PUBLICATIONS

Griffiths, H.D., et al., "Bistatic Radar Using Satellite–Borne Illuminators Of Opportunity," Intl. Conf. Radar 92 (Conf. Publ. No. 365), Brighton, UK, Oct. 12–13 1992, pp. 276–279.

Martin–Neira, M., "A Passive Reflectometry And Interferometry System (Paris): Application To Ocean Altimetry," E.S.A. Journal, vol. 17, No. 4, Jan. 1, 1993, pp. 331–335.

*Primary Examiner*—Gregory C. Issing
*Attorney, Agent, or Firm*—Pollock Vande Sande & Amernick

[57] ABSTRACT

A method of geoid measurement and/or earth imaging, characterized in that at least one directional antenna (2) is used to pick up a radio signal from a satellite and reflected on the ground, and said signal is processed using a reference signal that corresponds to the radio signal from the satellite in order to obtain a geodesic measurement and/or an image of the zone (Z) towards which the directional antenna (2) is pointed.

13 Claims, 2 Drawing Sheets

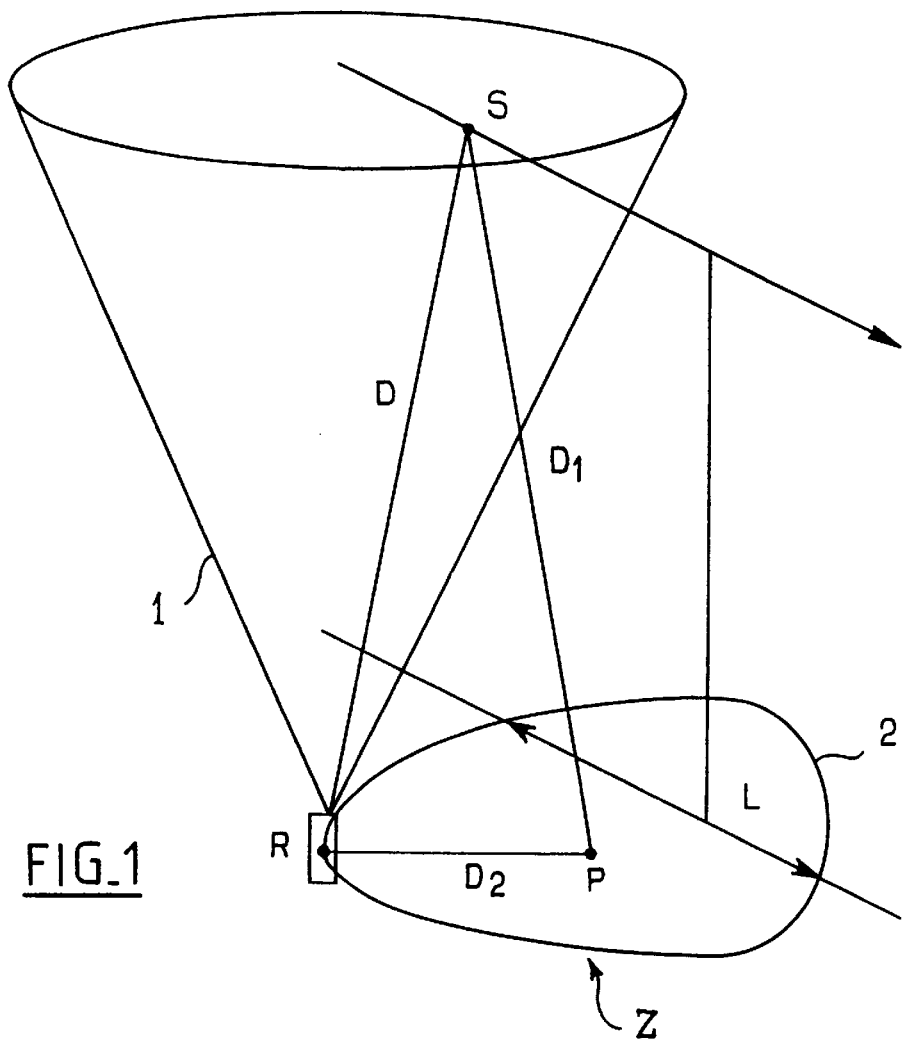
FIG_1
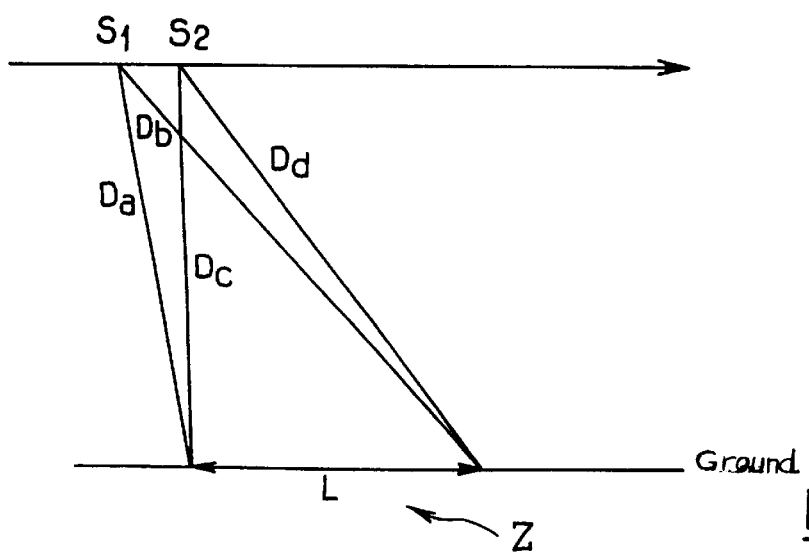
FIG_2

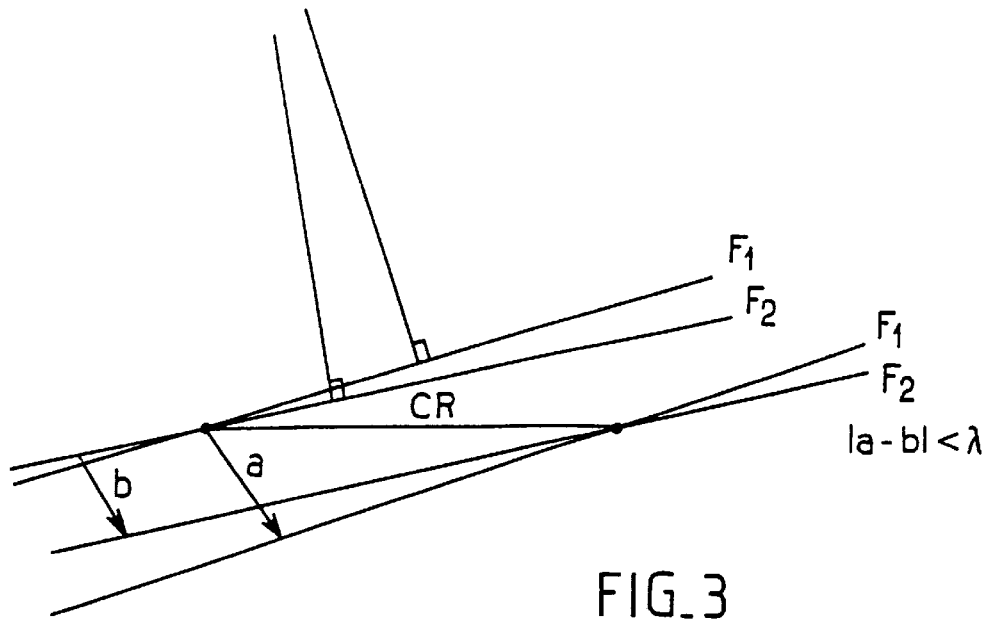
FIG_3
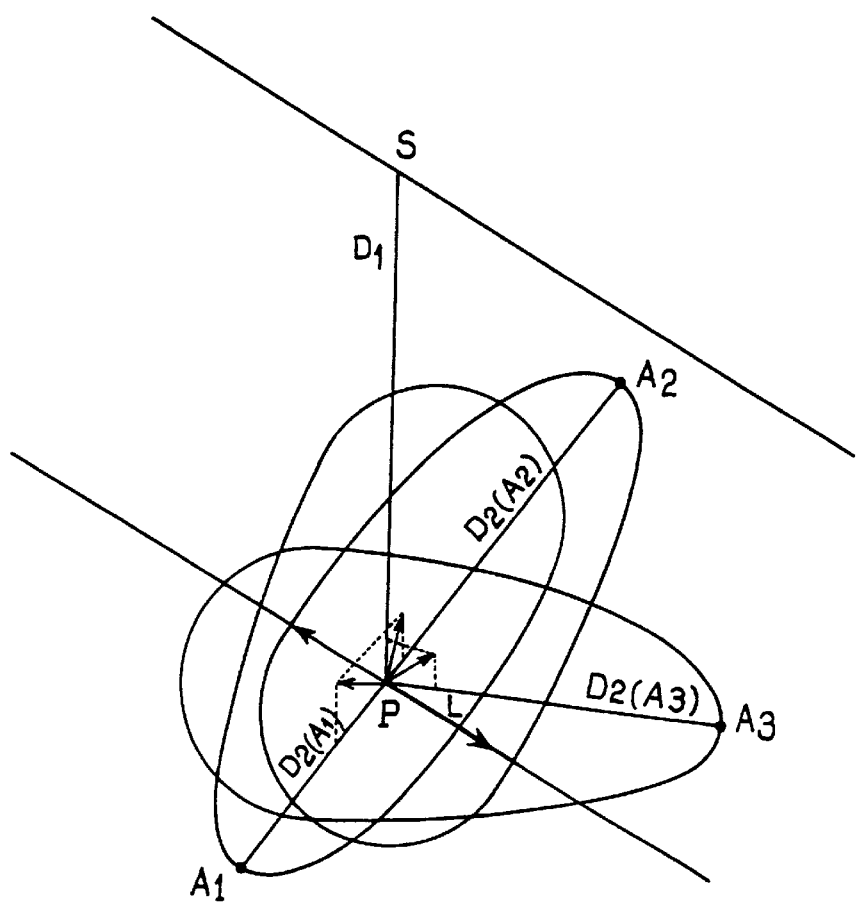
FIG_4

METHOD AND APPARATUS FOR GEODETIC SURVEYING AND/OR EARTH IMAGING BY SATELLITE SIGNAL PROCESSING

BACKGROUND OF THE INVENTION

The present invention relates to a method and to apparatus for measuring the geoid and/or imaging the earth by processing radio signals from satellites.

Conventionally, geoid measurement or earth imaging at microwave frequencies is performed using synthetic aperture radar (SAR) of the kind found on board certain observation satellites, such as the satellite ERS-1.

In particular, by applying interferometry to SAR images, it is possible to track seismic deformations of the earth, earthquakes, volcanic eruptions, etc. . . . . .

For a description of satellite radar interferometry techniques and applications thereof to imaging the earth and measuring the geoid, reference may advantageously be made to the various publications below:

"Deflation of Mount Etna monitored by spaceborne radar interferometry", Didier Massonnet et al., Letters to Nature, Vol. 375, No. 6532, Jun. 15, 1995;

"Radar interferometric mapping of deformation in the year after the Landers earthquake", Didier Massonnet et al., Letters to Nature, Vol. 369, May 19, 1994;

"Satellite radar interferometric map of the coseismic deformation field of the M=6.1 Eureka Valley, Calif. earthquake of May 17, 1993", Didier Massonnet, Kurt L. Feigl, Geophysical Research Letters, Vol. 22, No. 12, pp. 1541–1544, Jun. 15, 1995;

"The displacement field of the Landers earthquake mapped by radar interferometry", Didier Massonnet et al., Letters to Nature, Vol. 364, No. 6433, Jul. 8, 1993;

"Discrimination of geophysical phenomena in satellite radar interferograms", Didier Massonnet, Kurt L. Feigl, Geophysical Research Letters, Vol. 22, No. 12, pp. 1537–1540, Jun. 15, 1995.

Reference may also be made to the following publication:

"A passive reflectometry and interferometry system (Paris): application to ocean altimetry", Martin-Neira M, E.S.A. Journal, Vol. 17, No. 4, Jan. 1, 1993, pp. 331–355, which describes a method of calculating altitude without making use of an image.

Geometers on the ground find it difficult to make use of satellite-borne SAR observation of the earth, given that in general they are not specialists in such techniques.

SUMMARY OF THE INVENTION

An object of the invention is to propose a method and apparatus for performing imaging and geoid measurement that give access to the same information as satellite-borne SAR techniques while also being very easy to use on the ground.

Comparing a reflected signal with a reference signal is a technique that is used in other applications, for example when determining radio images for the purpose of providing aircraft with assistance in landing, as proposed in DE 42 10 823.

Nevertheless, in that document, the reflected signal and the reference signal are taken from a system that is moving (an aircraft), thereby putting constraints on the time interval during which the reference radiation can be observed, thus imposing data processing that is complicated, since it is necessary to take account of the movement parameters of the receivers, and thus making precise measurement impossible.

In particular, that method does not make it possible to compare signals taken on different dates and cannot provide geodesic information concerning ground movement between two dates, and it is even less capable at providing three-dimensional information.

The invention proposes a method of geoid measurement and/or earth imaging characterized in that at least one directional antenna that is fixed relative to the ground is used to pick up a radio signal transmitted from a satellite and reflected on the ground. This signal is processed using a reference signal that corresponds to the radio signal transmitted from the satellite in order to obtain a geodesic measurement and/or an image of the zone towards which the directional antenna is pointed.

Advantageously, in particular, interferometric processing is also implemented on images taken at different dates by a single directional antenna or simultaneously by antennas situated at distinct locations.

Thus, with a minimum of instruments to be manipulated, it is possible for a geometer on the ground to make fine geodesic measurements and also measurements of the displacement field in three dimensions.

The method is advantageously associated with the various characteristics below, taken singularly or in any technically feasible combination:

the reference signal is a radio signal picked up directly from the satellite by means of an antenna disposed in the vicinity of the directional antenna;

correlation processing is implemented between the reference signal and the reflected radio signal from the satellite as picked up by the directional antenna, together with a phase correction to take account of the displacement between two measurements of the satellite which transmits the picked-up signal; and the picked-up radio signal from the satellite is a GPS radio positioning signal or an SAR signal.

The invention also provides apparatus for geoid measurement and/or earth imaging, characterized in that it comprises a directional antenna that is fixed relative to the ground and that points towards the ground, a receiver at the output from the antenna, enabling a radio signal from a satellite to be picked-up after being reflected on the ground and received by the antenna, together with a processor for determining a geodesic measurement and/or an image of the zone towards which the antenna is pointed as a function of the picked-up signal and of a reference signal.

Advantageously, the apparatus includes an antenna disposed in the vicinity of the directional antenna to pick up a radio signal directly from the satellite for the purpose of serving as a reference signal.

The antenna for picking up the reference radio signal from the satellite is a non-directional antenna.

It may also be a directional antenna pointing towards the satellite whose radio signal is used.

BRIEF DESCRIPTION OF THE DRAWINGS

Other characteristics and advantages of the invention appear further from the following description. This description is purely illustrative and non-limiting. It should be read with reference to the accompanying drawings, in which:

FIG. 1 is a diagram showing an implementation of the invention;

FIG. 2 is a diagram showing the parameters to be taken into account when determining the correlation length;

FIG. 3 is a diagram showing the interferometric processing of the method proposed by the invention; and FIG. 4 shows how the invention is implemented for observing three-dimensional movements over a given zone.

DETAILED DESCRIPTION OF THE INVENTION

FIG. 1 shows a satellite S which transmits a radio signal towards the earth in a given frequency band.

On the ground, the apparatus of the invention is constituted by a receiver R which is disposed in the vicinity of the zone Z that is to be observed and which has two antennas represented in FIG. 1 by their radiation patterns 1 and 2.

Naturally, the receiver R may either be placed directly on the ground or it may be substantially fixed relative to the ground, e.g. by being carried by a captive balloon.

One of the antennas is a high and non-directional antenna (radiation pattern 1). It picks up the radio signal transmitted towards the ground by the satellite S. The signal picked up in this way serves as a reference signal.

The other antenna (radiation pattern 2) is a directional antenna and it observes the zone of the ground for which it is desired to make images or geodesic measurements.

This second antenna therefore receives the signal as back-scattered by the ground.

The satellite S and the radio signal it transmits can be of any kind.

As will have been understood, the invention presents the advantage of making it possible to obtain an image or geodesic measurements by making use of radio signals transmitted by space systems that are already in existence.

For example, and advantageously, the receiver R may be receiving a radio positioning signal transmitted by a satellite S in the GPS constellation.

Or indeed, the satellite S may be the satellite ERS-1, with the received radio signal being the signal transmitted by its SAR radar.

It should be noted that when a plurality of satellites are transmitting in the same frequency band, as applies in particular for GPS satellites, it is necessary for the high antenna to be somewhat directional in order to avoid interference between signals transmitted by the various transmitters of the satellites.

The receiver R includes means for appropriately amplifying the radio signals received by the antennas, an input filter matched to the space signal that is to be detected, and means for mixing the received signals with a transmitter carrier so as to recover signals in baseband. The carrier is reproduced with accuracy that is sufficient to ensure that any error is much smaller than the transmission bandwidth of the signal.

The receiver R also includes means for sampling the baseband signals obtained in this way. To conserve the working bandwidth, the sampling pitch is smaller than c/B where c is the speed of light and B is the bandwidth of the transmitter (ERS: 15 MHz; GPS: 20 MHz).

Throughout the text below, M(k) and S(k) designate the sampled signals output from the high antenna (signal as transmitted by the satellite) and by the directional antenna (echo signal), respectively, k being an integer index corresponding to sample indexing.

The receiver R includes means that perform correlation processing, image calculation processing, and interferometric processing.

These various kinds of processing are described below in detail.

1) Correlation producing lines

M and S are correlated and a corresponding signal L is calculated for a given time, i.e. at an index integer n on line $L_n$ such that:

$$L_n(i) = \sum_{k=n}^{k=n+length} M(k) * S(k+i)$$

where * designates the complex conjugation operation and "length" is the correlation length as explained in detail below.

This line $L_n$ is constituted by as many samples as there are different values of i.

In practice, it suffices for the line to cover the observed zone, and thus the number of samples is selected to be equal to the depth of the observed zone divided by the size of cell resolution, which is generally close to c/B.

In FIG. 1, there is marked a point P on the ground that is at a distance $D_1$ from the satellite S and a distance $D_2$ from the receiver R. The distance between the satellite S and the receiver R is written D, so the point P corresponds to sample for which:

$$i = (D_1 + D_2 - D) \cdot B/c.$$

The correlation length "length" is equal:

to the number of samples in a pulse if the transmitter operates discontinuously; for example, when receiving signals from the SAR transmitter of the satellite ERS-1 which transmits 30 μs pulses at a rate of about 1700 Hz, this length "length" is equal to 700;

to the number of samples that corresponds to the time required to go from one line to the next if the transmitter is of the continuous type (as in the GPS case). The reciprocal of this time is referred to herein as the "repetition pseudo-frequency".

The way this time is calculated is explained with reference to FIG. 2. To sample the signal sent over an observation zone of width L in the forward direction of the satellite (arrows in FIGS. 1 and 2) in an acceptable manner, a new measurement is picked up each time the signal becomes decorrelated, i.e. whenever the change of satellite position from position $S_1$ to position $S_2$ means that the difference between the lengths of the lines of sight to the ends of the observed zone changes by an amount equal to the wavelength, i.e.:

$$[(D_d - D_c) - (D_b - D_a)] < \lambda$$

where $(D_d - D_c)$ and $(D_b - D_a)$ are for positions $S_1$ and $S_2$ respectively, the difference in the lengths of the lines of sight between the satellite and the ends of the observed zone, and where λ is the wavelength of the pseudo-random signal.

For a GPS satellite situated vertically above an observed zone that is 10 km wide, the calculated repetition pseudo-frequency is 10 Hz, giving a time between lines of 0.1 seconds and a correlation length "length" of the order of 2 million. When the transmitting satellite moves away from its zenith position, the pseudo-frequency decreases (the value "length" given above is therefore still applicable).

If the same criterion is applied to the discontinuous case of the satellite ERS-1 observing a zone having a width of 5 km, a condition is found whereby the repetition pseudo-frequency must not be less than 850 Hz, i.e. half the frequency actually applied by the transmitter. This is explained by the fact that the system is designed to sample appropriately signals that have performed a go-and-return path between the satellite and the earth, which doubles all variations in distance. Another feature of using this system is that its pseudo-frequency does not change if the observed zone is more than 5 km wide, since in any event the ERS satellite illuminates a width of only 5 km, thereby putting a limit on the zone observed at any one instant. In any event, and as mentioned above, a discontinuous system imposes its repetition frequency on the device (1700 Hz for the ERS case).

It will be observed that since the reference signal is extracted directly by the high frequency antenna, there is no need for the receiver to have exact knowledge of the format of the signal it is using. In particular, the invention can be implemented using the GPS system without accurate knowledge of the codes being necessary.

Further, it will be observed that the correlation between the original signal and the signal from the ground also separates contributions from different GPS satellites that illuminate the observed zone simultaneously.

2) Determining the image

Image determination completes the above processing using line processing analogous to that implemented conventionally for synthetic aperture radar.

In this respect, reference may advantageously be made to the following publication:

"CNES general-purpose SAR correlator", D. Massonnet, M. Rossi, F. Adragna, IEEE (TGARS), Vol. 32, No. 3 (05-1994); the teaching of which is included herein by reference.

For example, the processing can include the following steps for each point of the observed zone:

the sample number i characteristic of the point is calculated in each of the above-described lines;

if the number is a fraction, then the line is optionally resampled to obtain a complex sample that corresponds exactly to i;

the phase of the resulting complex number is corrected by the phase difference $2\pi(D_1+D_2-D)/\lambda$ at the moment when the line was acquired relative to a reference difference, e.g. that calculated at the moment when the distance $D_1+D_2-D$ was at a minimum; and the complex numbers obtained for the point in each of the lines are summed.

An image is thus obtained made up of complex numbers, analogous to a synthetic aperture radar image.

Other processing architectures are naturally possible.

The resolution of the image in a direction perpendicular to the forward direction of the satellite is of the order of c/B. It can vary depending on the position of the transmitter and the direction of its trajectory relative to the aiming axis of the device.

Resolution relative to the forward direction of the satellite depends on the time during which the zone was observed and processed. In this direction, the size of a resolution cell is approximately equal to the width L of the zone divided by the product of the observation time multiplied by the minimum limiting value of the repetition pseudo-frequency.

If the signal-to-noise ratio of the resulting image is insufficient, the amplitude appearance of the image can be improved by performing quadratic detection in a pixel neighborhood. This operation improves the radiometric quality to the detriment of fineness of resolution. For interferometric processing, it is nevertheless necessary to retain the complex image so as to be in a position to combine it with another image, possibly subsequently improving the signal by averaging the combination.

3) Interferometric processing

Images taken on different dates by the same receiver R, or images taken simultaneously by two receivers R situated at distinct locations, can be combined by the technique of interferometry, which technique is itself known and is not described in particular detail herein.

For examples of applications of interferometry techniques, reference may advantageously be made to the articles mentioned above and also to:

"Radar interferometry: limits and potential", D. Massonnet, The. Rabaute, IEEE (TGARS), Vol. 31, No. 2 (03-1993).

Reference may also advantageously be made to the various publications cited by reference in those articles.

It may be observed that an important advantage of the invention lies in relaxing the conditions imposed by the technique of interferometry on the precision with which satellite trajectories need to repeat, which conditions are described in general terms in reference [5], such relaxation being by a factor of about two and being due to the fact that the wave travels along a single path only.

More precisely, a ground resolution cell must be observed with a difference of incidence in each image that does not amount to a path length difference equal to or greater the wavelength $\lambda$. This is shown in FIG. 3 where there can be seen wavefronts $F_1$ and $F_2$ for a single resolution cell CR. The sizes of resolution cells being respectively "a" and "b", the condition for interferometry requires $|b-a|<\lambda$.

For ERS-1, the limiting difference between two orbits enabling interferometry to be applied to images acquired during those two orbits is of the order of 1 km. This condition is satisfied for 60% of its orbits.

For images obtained implementing the invention by receiving ERS radar signals, this limit rises to 2 km. Under such circumstances, nearly all orbits can be used.

For a GPS transmitter, in order to remain within the conditions for interferometry, it is necessary for the difference relative to the nominal orbit to be no greater than about 250 km. This technique can therefore be applied at least in the following circumstances:

The GPS constellation comprises 24 satellites whose trajectories lie in six orbital planes with four satellites per plane, which planes are fixed relative to the stars. The orbits are 12-hour orbits. If a comparison is to be made between an image acquired when a GPS satellite was at the zenith of the zone, for example, with another image, then it is necessary to wait for the zone to move again into one of the six orbital planes. In particular, after one day has elapsed, the zone will again be approximately in the same orbital plane beneath the same satellite, but with a difference of 4 minutes (due to the difference between the solar day and the sideral day), whereas rotation of the earth during the same length of time gives rise to a difference of 110 km at the most (at the equator).

There exist numerous other occasions when interferometric combinations can be made between different GPS satellites. For example after 6 hours or 12 hours, or indeed after waiting for the sideral difference (which amounts to 1 hour in 15 days) combined with a change of plane (any given point on the earth passing through a GPS orbital plane every 2 hours) making it possible to lie under some other GPS satellite to within better than 250 km.

An example of a possible use of the invention is described below with reference to FIG. 4.

FIG. 4 shows a site at which it is desired to monitor movement in three dimensions. For this purpose, three receivers are used that are located at a plurality of points A1, A2, and A3 of the site. Each of these three receivers performs a measurement at both ends of the period of time being monitored. The directional antennas of these receivers (represented by their radiation patterns) are directed, as shown in FIG. 4, so as to make it possible to monitor movement of the site in three dimensions.

For a given point P of the site, each of the receivers is sensitive to variation in the sum of the distances $D_1$ and $D_2$, where $D_1$ is the distance between P and the transmitting satellites, and $D_2$ is the distance between P and the receiver. Geometrically speaking, each receiver measures, for point P, its displacement along the vector normal to the ellipsoid of revolution passing through the point P and having focuses at the mean position of the transmitter while measurement is being performed and at the position of the receiver. It will be understood that by an appropriate disposition of the three receivers, it is possible to reconstruct all three dimensions of any movement at the point P.

If it is known that the movement is purely vertical, it can be measured more simply using a single receiver that performs measurements at both ends of the period of time being monitored. For each image point, comparing pairs of measurements will give a displacement that can be attributed in full to the vertical component of the normalized vector SP, which vertical component is written $SP_Z$, and if the phase difference measurement gives x% of the wavelength, then the vertical movement of point P is $x.\lambda/SP_Z$.

When receiving GPS, the two frequencies of the signal can be used to detect and eliminate the effects of passage through the ionosphere.

It is also possible to envisage a system that is capable of receiving a plurality of satellites simultaneously, e.g. four GPS satellites as is conventional with GPS receivers.

Such receivers have two receiver means tuned to two frequencies, together with a large antenna directed towards the ground.

It is also possible to provide for the reference radio signal to be picked up by the receiver(s) via directional antennas of small size that are pointed mechanically or electronically at the satellites.

The eight signals picked up in this way by a receiver then make it possible to determine the position of the receiver, after which the signals reflected by the ground are digitized (at 20 MHz) and mixed, with varying delays, thus making it possible to distinguish the signals from each of the satellites and to organize them as a function of the distances $D_1+D_2$ (using the notation of FIG. 1). It will be observed that in this case also, the receivers extract directly the GPS reference signals. There is therefore no need to subscribe to the precise code.

Further, the correlation of the original signal with the signal coming from the ground also separates the contributions from the various GPS satellites.

As will have been understood, the system of the invention presents numerous advantages.

Given that it does not itself issue any radio signal, it can be installed without requiring any special authorization.

Since the signal from most of the transmitters is received on the ground at a low angle of incidence, the system is particularly sensitive to vertical movements, even though the receivers are generally located in a common plane (the plane of the ground).

Geodesic measurement is accompanied with an image analogous to the images obtained using imaging radars. Although the image is not as easy to interpret as a conventional image, it makes it possible to identify and detect possible artifacts by providing a visual representation of the geodesic measurement.

I claim:

1. A method for determining geodesic movement, comprising:

fixing a directional antenna relative to a ground surface such that the directional antenna is oriented to observe a zone of the ground surface;

receiving radio signals transmitted by a satellite and reflected by the zone of the ground surface with the directional antenna, at different times;

processing the received signals with a reference signal transmitted from the satellite through an interferometric imaging process to detect or measure geodesic movements of the zone.

2. A method according to claim 1, wherein interferometric processing is also implemented on images taken at different dates by a single directional antenna or simultaneously by antennas situated at distinct locations.

3. A method according to claim 1, wherein the reference signal is a radio signal picked up directly from the satellite by an antenna disposed in the vicinity of the directional antenna.

4. A method according to claim 1, wherein the processing of the reference signal and the reflected radio signal from the satellite includes a phase correction to take account of the displacement between two measurements of the satellite.

5. A method according to claim 1, wherein the radio signal from the satellite is a GPS radio positioning signal.

6. A method according to claim 1, wherein the radio signal from the satellite is an SAR signal.

7. Apparatus for geoid measurement comprising:

a directional antenna fixed relative to the ground and which is oriented to observe a zone of the ground;

a receiver at an output from the antenna for picking up, at different times, a radio signal transmitted from a satellite after the signal has been reflected by the zone of the ground; and a processor for performing interferometric imaging processing to determine a geodesic measurement of the zone as a function of a reference signal transmitted from the satellite and the received radio signal.

8. Apparatus according to claim 7, further comprising an antenna disposed in the vicinity of the directional antenna to pick up a radio signal directly from the satellite for the purpose of serving as the reference signal.

9. Apparatus according to claim 8, wherein the antenna (1) for picking up the reference radio signal from the satellite is a non-directional antenna.

10. Apparatus according to claim 8, wherein the antenna for picking up the reference radio signal from the satellite is a directional antenna pointed at the satellite whose radio signal is used.

11. A method for measuring geodesic movement, comprising:

fixing at least one directional antenna relative to a ground surface such that the antenna is oriented to observe a zone of the ground surface;

receiving radio signals transmitted by a satellite and reflected by the zone of the ground surface with the at least one directional antenna, the radio signals being received at a beginning and an end of a time period;

processing the received signals with a reference signal transmitted from the satellite through an interferometric imaging process to detect or measure geodesic movements of the zone.

12. A method according to claim 11 wherein three directional antennas are provided and are arranged to measure geodesic movement in three-dimensions.

13. A method according to claim 11 wherein the beginning and end of the time period are different dates.

* * * * *